Oct. 6, 1959 P. B. HELSDON 2,907,821
TELEVISION APPARATUS
Filed Oct. 8, 1956
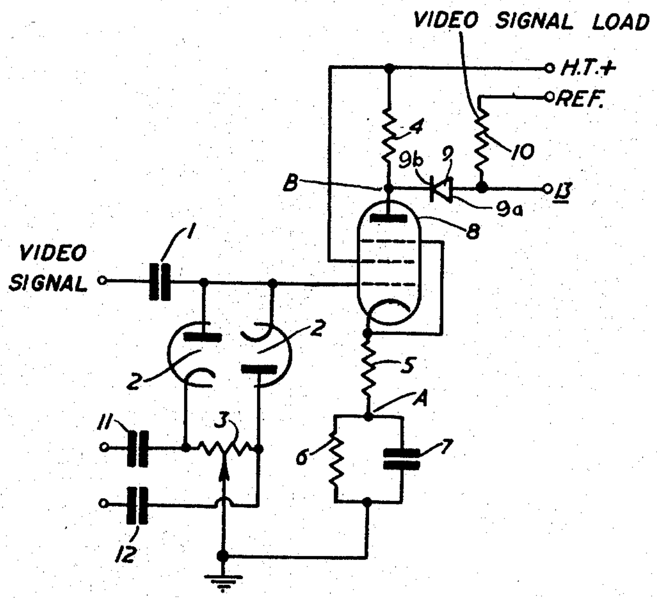
INVENTOR:
Peter Bennett Helsdon
BY: Baldwin & Wight
ATTORNEYS United States Patent Office 2,907,821

Patented Oct. 6, 1959

2,907,821

TELEVISION APPARATUS

Peter Bennett Helsdon, Chelmsford, England, assignor to Marconi's Wireless Telegraph Company Limited, London, England, a British company Application October 8, 1956, Serial No. 614,596

Claims priority, application Great Britain January 20, 1956

3 Claims. (Cl. 178—7.1)

This invention relates to television apparatus and though not limited to its application thereto is primarily intended for use in the television camera circuits of a television transmitter.

When the average brightness level in a picture or scene being televised varies widely, varied scatter of the light rays picked up by the camera also occurs. Such scatter often takes place within the optical system associated with the camera or even in the camera tube itself.

Such scatter tends to produce two defects in pictures reproduced by television receivers operated by the signals from the camera. These effects are (*a*) diffuse haloes are formed round reproduced images of white objects; and (*b*) an error in the level corresponding to black resulting in parts of the pictures which should be black being reproduced in shades lighter than black, e.g. as grey. The present invention seeks to eliminate or reduce the second of the above two defects.

As a result of light scatter the level of illumination in a reproduced picture of an area corresponding to a black area in the picture being televised is dependent upon the mean illumination averaged over the whole area and since this mean illumination is continually varying in dependence upon picture content, the effective black level of the transmitted signals and therefore of the reproduced pictures likewise changes. Hitherto this undesirable effect has usually been met, or partially met, by operation of a manual control means provided in the camera circuits for adjustment of the effective black level, an operator watching a picture which is reproduced from the camera signals and varying the control by hand as may be necessary to keep the black level in that picture satisfactory as judged by eye. The present invention seeks to apply automatic correction to the effective black level to compensate for the effect of scatter and thus to dispense with such manual control and, indeed, to provide a final result which is better than that normally achieved by an average operator.

The invention achieves its object in a very simple manner by providing an automatic control which is additional to the automatic black level clamping and the black level clipping controls normally provided, in present day practice, in television signal circuits.

According to this invention a television signal circuit arrangement includes in combination a black level clamping circuit, a black level clipping circuit and means responsive to the mean level of the television signals after they have been subject to black level clamping, for controlling the level at which the black level clipping circuit is operative.

As will be seen the means, provided by this invention, for controlling the level of black level clipping in dependence upon said mean level, can be of very simple nature involving only small additional cost.

One embodiment of the invention comprises in combination an amplifier valve; means for applying video signals to an input electrode of said valve; a periodically operated black level clamping circuit connected to said input electrode and adapted to clamp the signals applied to said input electrode; a black level clipping circuit connected to the output electrode of said valve and including a rectifier connected in a circuit extending from said output electrode to a source of reference potential, and means for controlling the mean current through said valve in dependence upon the voltage built up by said signals across a time constant circuit of time constant which is long relative to the television frame period. Conveniently the time constant circuit may be included in the cathode return circuit of said valve.

The invention is illustrated in the accompanying drawing which shows diagrammatically and so far as is necessary to an understanding of the invention, one embodiment of the invention as applied to a television transmitter.

Referring to the drawing television signals derived from a television camera tube (not shown) or video signals are applied through a condenser 1 to a valve 8 having an output resistance 4 and a cathode resistance 5 included in its cathode return circuit.

Included in the grid circuit of the valve 8 is any convenient known form of black level clamp. That actually shown is well known per se and consists of a pair of oppositely connected diodes 2 to which are applied, through condensers 11, 12, clamping pulses at line frequency derived from a suitable part (not shown) of the television signal circuitry in accordance with well known common practice. The pulses applied through condensers 11, 12 set the level of clamping and this level can be manually adjusted by adjusting an earthed adjustable tap on a resistance 3 connected between the condensers 11, 12 on the diodes sides thereof. To the anode of valve 8 is connected any known form of black level clipper, that shown comprising a rectifier 9 and resistance 10 constituting a video signal load fed from a positive reference voltage connected at REF. Rectifier 9 has its anode 9*a* connected to one side of the video signal load 10 and the cathode 9*b* thereof connected with the anode of the valve 8. 13 is the output terminal. The circuit as so far described is well known and being in accordance with common practice requires no further description. In accordance with this invention there is also included, in series in the cathode return circuit of valve 8 a resistance 6 shunted by a condenser 7, this resistance-condenser combination being dimensioned to provide a time constant of 6 and 7 being long relative to the frame period of the television scanning.

The control grid of the valve 8 is fed with a clamped positive going signal so that the mean anode current of this valve will be dependent upon the average brightness of the picture signal. Consider the voltage to earth developed at point A in the cathode circuit of the valve 8. Any increase in signal at the control grid due to an increase in average brightness of the picture will increase the cathode current and consequently the charge in condenser 7 will be increased. This increase in charge will cause the potential at point A during intervals between clamping pulses applied through condensers 11 and 12 to be increased relative to the potential which would be present at that point if the average picture brightness were lower. Effectively, therefore, the control grid of valve 8 is relatively more negative during the clamping intervals and the resulting reduction in anode current will raise the potential at point B and, since the clipper rectifier 9 has a constant reference potential REF applied to it, the clipper will operate at a higher level. By suitable choice of resistance 6 the increase in operating level of the clipper 9 can be made to compensate for the error in the level corresponding to black in the signal applied to the grid of valve 8 and in this manner the correct effective black level in the output signal from valve 8 is maintained automatically in spite of changes in average brightness level.

In one satisfactorily experimentally tested embodiment the time constant provided by resistance 6 which was 82 ohms and condenser 7 of 1,000 UF was made equal to 0.15 sec., the frame period of the television scanning being, in this case, 0.04 sec.

The invention is not limited to the particular circuit shown and many modifications are possible: for example, although in the diagram the correction circuit 6—7 is connected in the cathode return circuit of the clamped valve 8, it could be connected in the lead to the screen grid instead or in series with the clipper reference voltage. Again although the invention is primarily intended for use in television transmitter installations, obviously it can be used at any suitable point in a television signal channel—for example in a video frequency stage in a television receiver.

I claim:

1. In combination in a television signal circuit arrangement an amplifier valve; means for applying video signals to an input electrode of said valve; a periodically operated black level clamping circuit connected to said input electrode and adapted to clamp the signals applied to said input electrode; a black level clipping circuit having a variable clipping level and being connected to the output electrode of said valve, said clipping circuit including a rectifier having at least an anode and a cathode connected in a circuit extending from said output electrode to a source of reference potential, a video signal load across which the clipped video signals are developed connected in a path between the said source of reference potential and the anode of said rectifier excluding the anode/cathode path through the rectifier, means for taking signals from across said load and means for varying the clipping level comprising means for controlling the mean current through said valve in dependence upon the voltage built up by said signals across a time constant circuit of time constant which is long relative to the television frame period.

2. A combination as claimed in claim 1 wherein the time constant circuit is included in the cathode return circuit of said valve.

3. A television transmitter including in a video signal stage thereof a valve; means for applying video signals to the control grid of said valve; a black level clamping circuit connected to said control grid; a black level clipping circuit having a variable clipping level connected to the anode of said valve and also to a source of reference potential; a video signal load across which the clipped video signals are developed connected in a path excluding the anode/cathode path through said rectifier between the said source of reference potential and the anode of said rectifier, a resistance-capacity time constant circuit of time constant which is long relative to the frame period of the television scanning connected in the cathode return leg of said valve, the whole arrangement being such that the level at which said black level clipping circuit is operative depends upon the mean level of the television signals after subjection to black level clamping.

References Cited in the file of this patent

UNITED STATES PATENTS

| | | |
|---|---|---|
| 2,297,612 | Fandell | Sept. 29, 1942 |
| 2,583,345 | Schade | Jan. 22, 1952 |
| 2,717,931 | Duke | Sept. 13, 1955 |

FOREIGN PATENTS

| | | |
|---|---|---|
| 661,807 | Great Britain | Nov. 28, 1951 |